Oct. 13, 1931.  H. F. HITNER  1,827,472
APPARATUS FOR MAKING GLASS
Filed Feb. 28, 1930   3 Sheets-Sheet 2
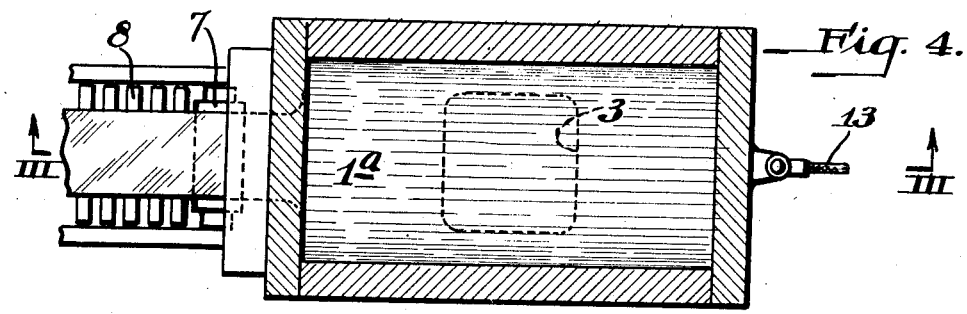
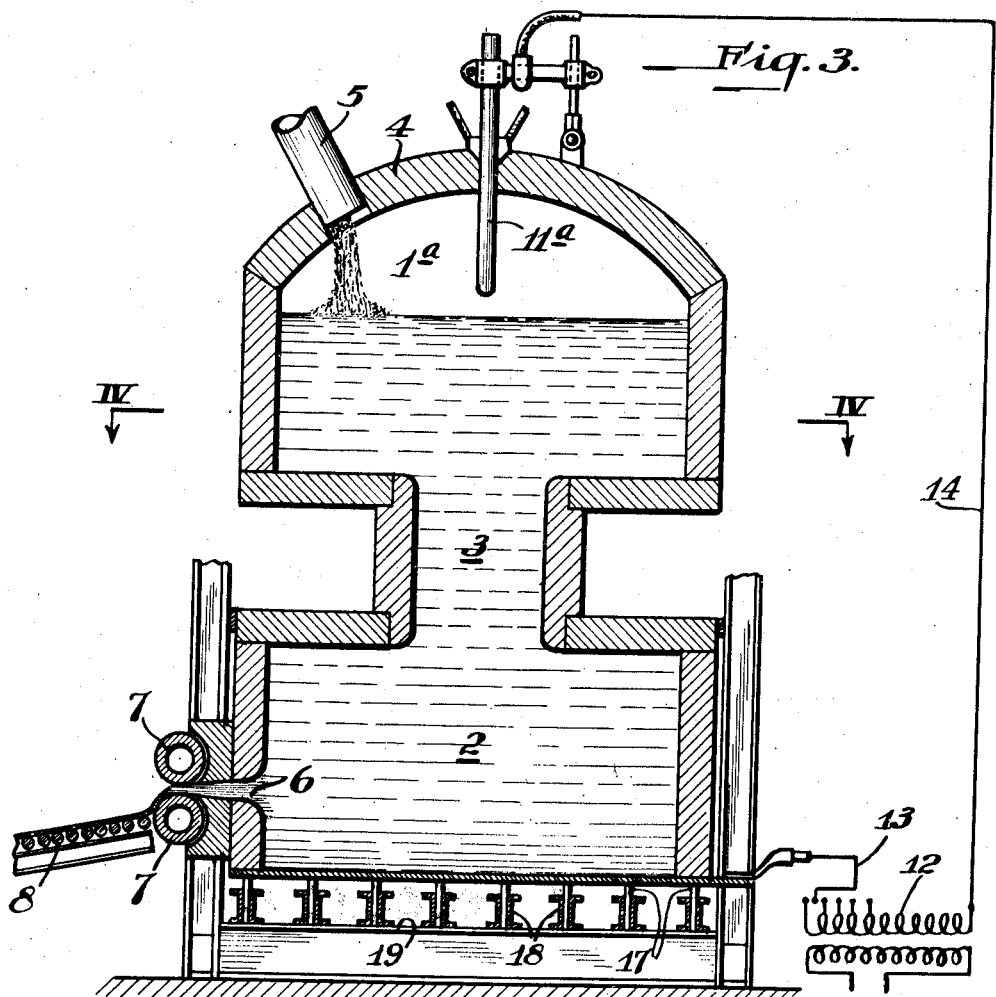

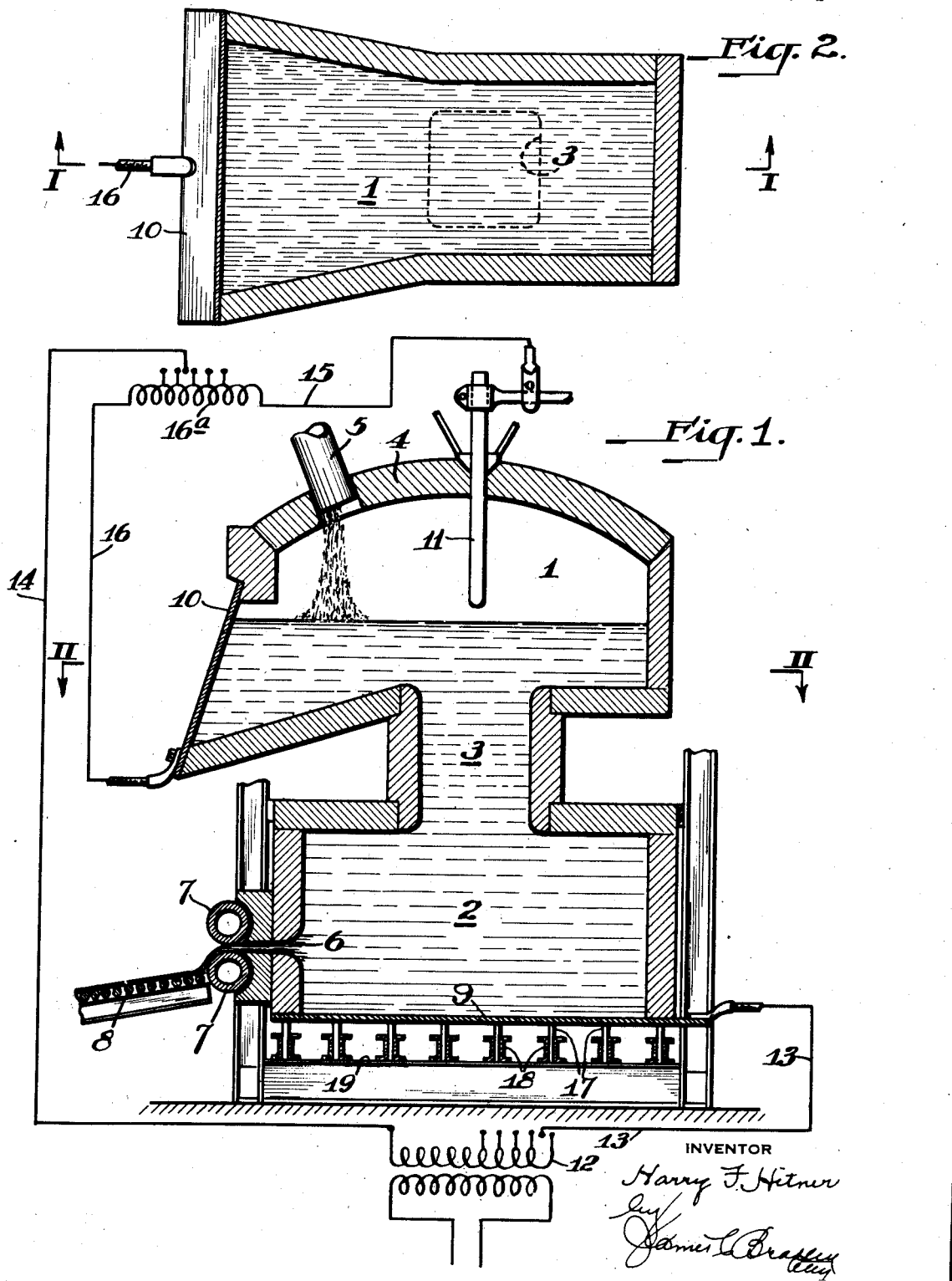

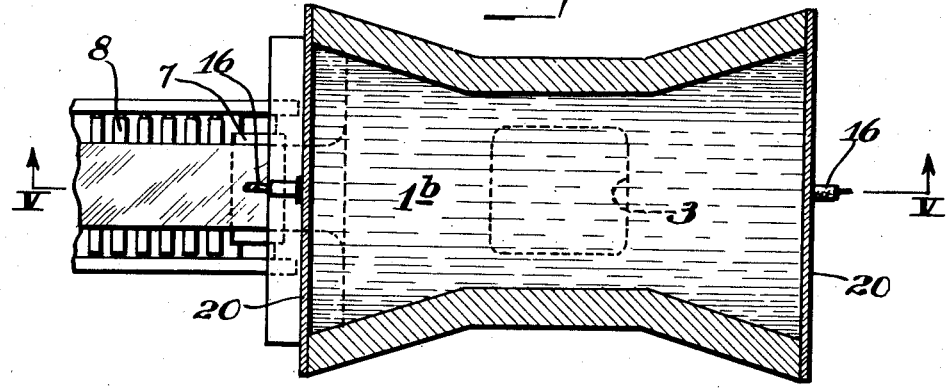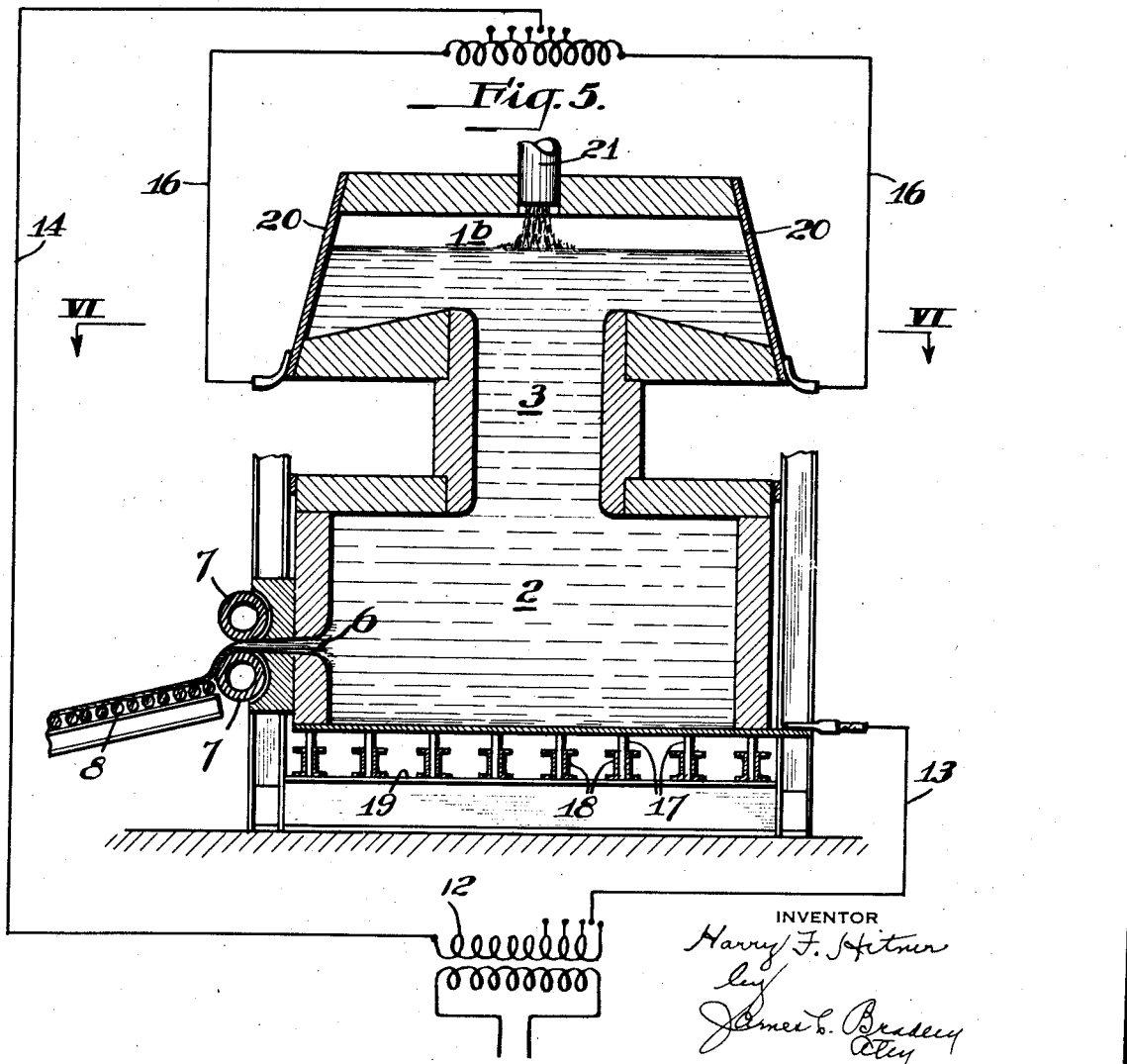

Patented Oct. 13, 1931

1,827,472

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

APPARATUS FOR MAKING GLASS

Application filed February 28, 1930. Serial No. 432,072.

The invention relates to apparatus for making glass and the like by the use of electricity as a melting and fining agent. The invention has for its objects the provision of an improved apparatus, (1) in which the maximum heating effect of the current is secured in the bath at a point remote from the side walls of the tank, thus reducing the corrosive action of the bath; and (2) in which a complete separation of the completely reduced and finished glass from the partially reduced glass is secured. Certain embodiments of the invention are illustrated in the accompanying drawings, wherein:

Figure 1 is a vertical section through one form of the furnace on the line I—I of Fig. 2. Fig. 2 is a section on the line II—II of Fig. 1. Fig. 3 is a vertical section through another form of furnace on the line III—III of Fig. 4. Fig. 4 is a section on the line IV—IV of Fig. 3. Fig. 5 is a vertical section through still another form of furnace on the line V—V of Fig. 6. And Fig. 6 is a section on the line VI—VI of Fig. 5.

Referring first to the construction of Figs. 1 and 2, the tank shown is constructed with walls of refractory material and comprises an upper chamber 1 and a lower chamber 2 connected by a neck 3 whose horizontal cross section is less than that of the two chambers. Batch is supplied through the furnace arch 4 through a chute 5 and the molten glass is withdrawn from the lower chamber 2 through the outlet 6 passing in a sheet or ribbon between the water cooled rolls 7, 7 and onto a roller apron 8 from which it is conducted through a leer, not shown.

Current is supplied through the glass in the tank from the three electrodes 9, 10 and 11, 9 and 10 being plate electrodes and 11 being an arc electrode. These electrodes are connected with the transformer coil 12 by means of the leads 13, 14, 15 and 16, an equalizer 16a being employed to regulate the distribution of current between the electrodes 10 and 11. As shown, single phase current is employed and the flow of current occurs between the electrodes 10 and 11 on the one hand and the electrode 9 on the other hand, so that all of the current passes through the neck portion 3 of the tank. Due to the reduced cross section of the neck 3 as compared with that of the chambers 1 and 2, the current exercises its greatest heating effect in the neck and a vigorous boiling effect occurs here and in the body of the glass immediately above the neck. This gives a degree of heat necessary to completely reduce the batch, and the boiling action in the neck and immediately above such neck serves to separate the unmelted portions of the batch from the completely melted portions, the completely finished glass settling into the lower chamber 2, while the unfinished glass tends to rise into the chamber 1, where in the course of time it becomes completely reduced. A very intense heat is produced in the batch immediately below the arc electrode 11 serving to reduce rapidly any unmelted batch floating upon the surface of the bath. This point of maximum heat is remote from the side walls of the furnace so that the eroding or corrosive action of the batch upon the side walls is reduced to a minimum. The electrodes 9 and 10 are of the plate type, preferably of nickel chromium alloy which will not discolor the glass under the heat conditions normally present in the tank, and such plates are kept cooled by direct exposure to the atmosphere on their outer sides. The use of the arc electrode 11 in addition to the plate electrode 10 also serves to keep down the temperature of the electrode 10 which would be much more highly heated if all the current passing through the body of glass were supplied to this electrode rather than being divided with the electrode 11. In order to support the bottom electrode, which becomes highly heated and would otherwise sag, a series of plates 17 are employed carried between the pairs of channel bars 18, 18, such channel bars being supported in turn upon the transverse channel 19.

Figs. 3 and 4 illustrate a modification which differs from the construction of Figs. 1 and 2 only in the omission of the plate electrode 10, all the current to the upper chamber 1a being supplied through the arc electrode 11a. In other respects, the construction is the same throughout as that of Figs. 1 and 2 and the same reference numerals are used for similar parts.

Figs. 5 and 6 show still another modification which differs from the constructions already described in that no arc electrode is employed in the upper chamber 1b. Current is supplied to the glass in the upper chamber in this construction by means of the pair of inclined electrodes 20, 20. In this construction, batch is supplied to the upper chamber through the chute 21 which discharges into the center of the chamber above the upper end of the neck. In other respects, this construction is the same as those of Figs. 1 to 4 and the same reference numerals are supplied for corresponding parts.

The tank and associated apparatus is suitable for the reduction of vitreous products other than those commonly referred to as glass, such as the vitreous enamels, which are a species of glass, and silicate of soda, which is sometimes referred to as soluble glass. It will be understood, therefore, that the term "glass" is used in its broad sense and that the furnace is not limited to use in the melting of the ordinary forms of glass.

What I claim is:

1. In combination in an electric furnace for making glass, a vertical tank having means for supplying batch to the upper end thereof and for withdrawing the melted glass from the lower end thereof, an electrode contacting with the glass in the lower end of the tank, an arc electrode above the surface of the glass at the upper end of the tank and remote from the side walls thereof, and means for supplying current to the electrodes.

2. In combination in an electric furnace for making glass, a vertical tank having means for supplying batch to the upper end thereof and for withdrawing the melted glass from the lower end thereof, an electrode contacting with the glass in the lower end of the tank, an arc electrode above the surface of the glass at the upper end of the tank and remote from the side walls thereof, a third electrode contacting with the glass in the upper end of the tank, and means for supplying current to the electrodes to secure a flow of current through the glass between the electrode at the lower end of the tank and the two electrodes at the upper end of the tank.

3. In combination in an electric furnace for making glass, a tank comprising a pair of chambers arranged one above the other with a connecting vertical neck of a horizontal cross section less than that of the chambers, an electrode contacting with the glass in the lower chamber, an arc electrode above the surface of the glass in the upper chamber in alignment with said neck, means for supplying current to the electrodes and means for supplying batch to the upper chamber.

4. In combination in an electric furnace for making glass, a tank comprising a pair of chambers arranged one above the other with a connecting vertical neck of a horizontal cross section less than that of the chambers, an electrode contacting with the glass in the lower chamber, an arc electrode above the surface of the glass in the upper chamber in alignment with said neck, a plate electrode constituting one of the side walls of the upper chamber, means for supplying current to the electrodes, and means for supplying batch to the upper one of said chambers.

5. In combination in an electric furnace for making glass, a vertical tank having means for supplying batch to the upper end thereof and for withdrawing the melted glass from the lower end thereof, an electrode contacting with the glass in the lower end of the tank, a pair of electrodes at the upper end of the tank, at least one of which contacts with the glass, an equalizer to which said pair of electrodes are connected, and means for supplying alternating electric current to said electrode in the lower end of the tank and to the equalizer.

6. In combination in an electric furnace for making glass, a vertical tank having means for supplying batch to the upper end thereof and for withdrawing the melted glass from the lower end thereof, an electrode contacting with the glass in the lower end of the tank, a pair of electrodes at the opposite sides of the upper end of the tank, in contact with the glass, an equalizer to which said pair of electrodes are connected, and means for supplying alternating electric current to said electrode in the lower end of the tank and to said equalizer.

In testimony whereof, I have hereunto subscribed my name this 22nd day of February, 1930.

HARRY F. HITNER.